Nov. 29, 1932.  L. W. GALLOWAY  1,889,198
STOCKING DRIER ATTACHMENT
Filed Oct. 24, 1931
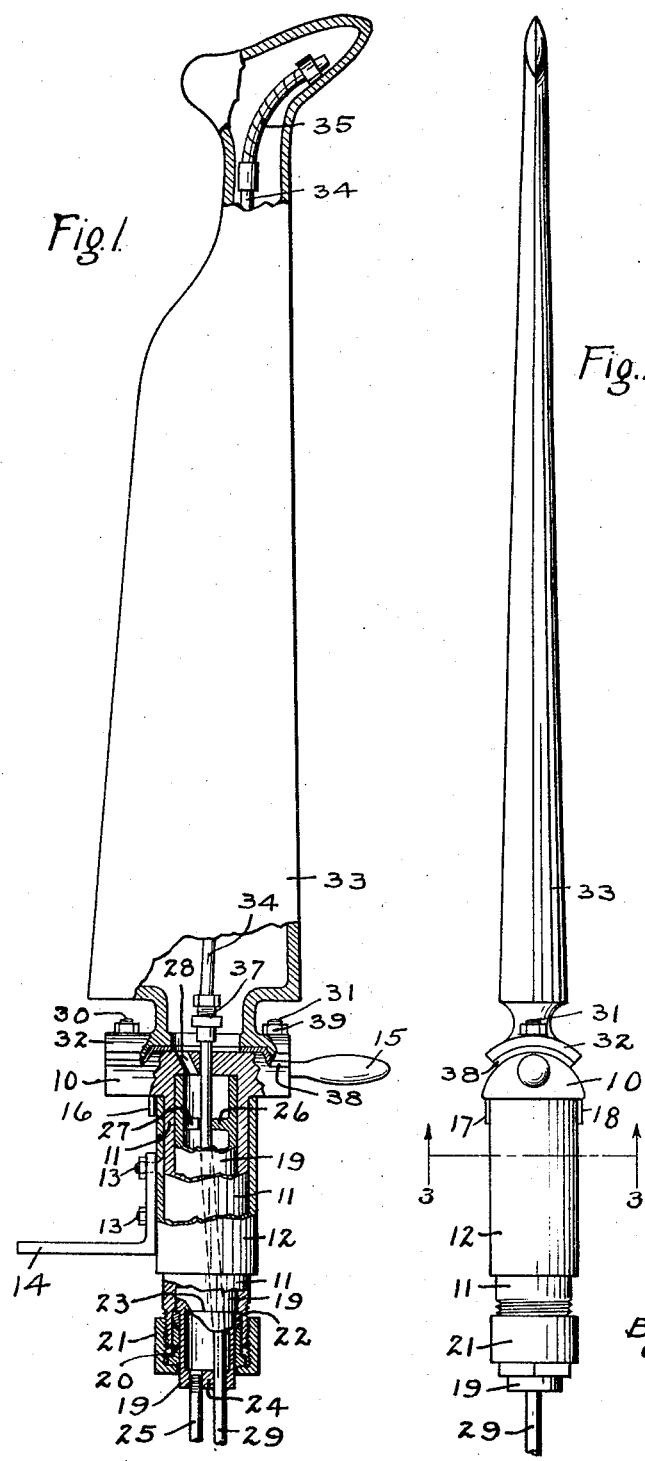
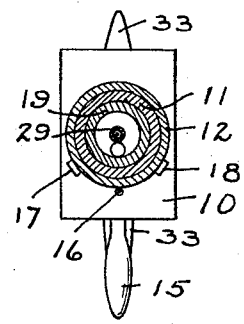
Inventor,
Leslie W. Galloway,
By Minturn & Minturn,
Attorneys.

UNITED STATES PATENT OFFICE

LESLIE W. GALLOWAY, OF INDIANAPOLIS, INDIANA

STOCKING DRIER ATTACHMENT

Application filed October 24, 1931. Serial No. 570,951.

This invention relates to the art of stocking form driers such as are employed in silk hosiery mills for the purpose of drying finished stockings to form. It is necessary to mount the form so that it may be turned from side to side in order that the operator may determine easily and quickly the position of the stocking thereon in order that the stocking may be dried to have the rear seam in a straight line. The form has been heated by means of passing steam or hot water through it to maintain the desired temperature. Heretofore the connections with the form from the hot water or steam supply and return have been made by means of rubber tubing or hose so that the form could be rocked in relation to the supply and return pipes. Due to the temperature of the steam or water which flowed through these rubber tubes, the life of the tubes was relatively short and continual trouble was had with leaks about the connecting ends of the tubes and also with the actual blowing out of the tubes themselves due to the failure of the wall resulting from the internal pressure and heat. Metal tubing has been substituted for the rubber tubing but under the continual bending as occasioned by the frequent turning of the form, the metal tubing has broken and given considerable trouble much the same as with the rubber tubing.

It is an important object of my invention to provide connections between the form and the supply and return pipes in such a manner that all flexible tubing whether rubber or metal may be eliminated.

A further important object of the invention is to provide a simple inexpensive form support which will permit the form to be swiveled or rotated thereabout and from which support rigid pipes may lead without the necessity of having to use flexible couplings of any nature.

A still further important object of the invention is to provide a combined support and heat conducting attaching means for the form whereby free movement of the form may be had and the possibility of leakage reduced to the minimum.

These and other important objects will become apparent in the following description of one particular form of the invention as illustrated by the accompanying drawing, in which.

Fig. 1 is a fragmentary side elevation of a structure embodying my invention.

Fig. 2, a front elevation of the structure and,

Fig. 3, a horizontal transverse section on the line 3—3 in Fig. 2.

Like characters of reference indicate like parts throughout the several views in the drawing.

I form a head 10 to be substantially half of a horizontally disposed cylinder with the convex side upward. This head 10 has an integral depending tubular body 11 which is received rotatably within the supporting cylinder 12. The head 10 rests by its under side against the top end of the cylinder 12. The cylinder 12 is fixed in position and vertically supported by means of bolts 13 which extend from one side thereof to be received through a supporting angle 14. A handle 15 is secured to one end of the head 10 as a means for turning the head around in relation to the cylinder 12.

In order to limit the amount of rotation of the head 10 I provide a stop pin 16 which is fixed to the under side of the head to project downwardly along the outer side of the cylinder 12 so as to be free to be moved therearound as the head 10 may be turned and in the path of this pin 16 I fix stops 17 and 18 on the cylinder 12 and space these stops apart to limit the travel of the pin 16 therebetween to the desired amount. This amount is usually a quarter of the complete revolution.

Within the body 11 I revolubly fit the tube 19. The lower end of this tube 19 is turned to have a smaller diameter than that of the main portion thereof and the lower end of the body 11 is counter-bored to receive a packing ring 20 therebetween. A packing nut 21 screwthreadedly surrounds and engages with the lower body 11 and is employed as a means to carry the ring 20 upwardly to force the packing 22 thereabove against the joint between the tube 19 and the body 11 and also to retain the tube 19 in an upper position. The ring 20 is fitted closely about the lower end of the tube 19 to permit its turning therearound but at the same time to prevent the dropping down of the tube 19 by reason of the packing 22 being carried about the upper end of the ring 20 in compressed relation against the shoulder 23 about the tube 19 at the upper end of the reduced section thereof.

The lower end of the tube 19 has a closure 24 thereacross and this closure has a drain hole therethrough into which is screwthreadedly engaged the drain pipe 25. An upper closure 26 is provided within the tube 19 but spaced downwardly somewhat from the upper end thereof in order to form a small chamber above the closure 26 and the end of the tube 19. This closure 26 has an opening 27 therethrough and the head 10 is also provided with an opening 28 from its upper side discharging into the chamber in the upper end of the tube 19 so that a continuous drain may be had through the opening 28 into the upper end of the tube 19, thence down through the opening 27 through the main part of the tube 19 and thence out the bottom of the tube 19 through the pipe 25. A supply pipe 29 is passed through the bottom closure 24 and the upper closure 26 in fixed relation to each of the closures and with a tight joint in each case. This pipe 29 rotatably extends through a hole in the head 10 to extend slightly thereabove. The pipe 29 is held fixed to the tube 19.

From the upper side of the head 10 vertically extend the studs 30 and 31 to receive thereover the flange 32 of the form 33. This form 33 is made in the usual well known manner (the exact details of which do not enter into my invention) and is provided with an inlet pipe 34 which extends freely from the lower end of the form upwardly therethrough to have a length of flexible tubing 35 fixed thereto and in turn fixed by its upper end to the form whereby a heating medium forced through the pipe 34 will be conducted to the extreme upper end of the form and discharge therein. Since the pipe 34 has its upper end supported from the form 33 by means of the flexible tubing 35, the pipe 34 may be held stationary while the form 33 is rocked within the limits of the desired rotation. The pipe 34 is connected by its lower end through a coupling 37 with the upper end of the pipe 29 before the flange 32 is drawn down over the studs 30 and 31. The flexible tubing 35 permits the necessary vertical movement of the pipe 34 in making this connection and the coupling 37 may be of any suitable form such for example as the well known compression fitting as is employed in copper tubing fitting. After the connection between the pipe 34 and 29 is made, the flange 32 is drawn down toward the head 10 over an intervening gasket 38 by the nuts 39 on the studs.

In using the device, the cylinder 12 is set up in the fixed position by being attached to the supporting angle 14 as above described and a suitable heat conducting medium such as steam or water, is directed through the pipe 29 to flow upwardly therethrough into the pipe 34, to discharge from the upper end of the flexible tube 35 into the toe of the form 33 from which position, the medium may flow downwardly through the form 33 out the central opening through the flange 32 to pass through the hole 26 in the head 10 and down through the tube 19 to discharge therefrom through the pipe 25 thus completing a flow throughout the length of the form 33. The form 33 may be rotated in relation to the member 12 by pushing the handle 15 to and fro, which action revolves the body 11 within the member 12. The rigidity of the pipes 25 and 29 prevent rotation of the inner tube 19 and any leakage of the heat conducting medium as may exist from around the upper end of the tube 19 down within the member 11 is prevented from escaping outside of the member 11 by reason of the packing 22 being forced upwardly between the member 11 and the tube 19. Such leakage is very easily controlled by this packing 22 by reason of the long bearing surface between the tube 19 and the member 11 over which the leakage would have to pass.

It is thus to be seen that I have provided a supporting and heat conducting medium attaching means for a stocking form that will permit the rotation of the form and at the same time take care of the inflow and outflow of the heating medium without danger of any of the connecting parts thereof blowing out and leaking.

While I have here shown and described my invention in the one form as now best known to me, it is obvious that structural changes may be made without departing from the spirit of the invention and I therefore do not desire to be limited to that precise form beyond the limitations as may be imposed by the following claims.

I claim:

1. For a stocking drier form having a hollow interior to receive a heat conducting medium, a fixed support, a head to which the form may be secured, a hollow body depending from the head revolubly fitted in said support, a tube revolubly fitted within said body, packing means between the lower end of said tube and said body close to the lower end, intake and discharge pipes fixed to said tube, said intake pipe extending through said head, and said head having a discharge passage passing from its upper side to discharge within said tube.

2. For a stocking drier form having a hollow body to receive therein a heat conducting medium, a fixed support, a tube within the support, a body revolubly fitted to extend between the tube and the support, a drain pipe connected to the tube, a head on the body closing it and the upper end of said tube, an intake pipe fixed to and extending through the tube to pass revolubly through said head, said head being formed to receive and retain said drier form thereon and having a discharge passage between the form and said tube.

3. A swivel support and heat conducting medium connection for a stocking drier form comprising a tubular support adapted to be held in a fixed vertical position, a tubular body fitted to revolve within the support, a head on the upper end of the body adapted to rest on the upper end of the tubular support and carry said tubular body in a depending position, said tubular body having a length to cause it to project below the lower end of the tubular support, a tube revolubly fitted within said tubular body having a length exceeding that of the tubular support and having its lower end reduced in diameter forming a shoulder, a sleeve revolubly fitted over that lower reduced diameter portion of the tube, packing between the sleeve and shoulder, a nut screw-threadedly engaging the lower end of said tubular body and revolubly passing over the lower end of the tube adapted to contact with and move the sleeve along said tube to compress the packing, a drain connection from the lower end of the tube, an intake passageway traversing the length of the tube and having a pipe leading therefrom revolubly passing through said head, and said head having a drain hole therethrough discharging over the upper end of said tube.

4. In a swivel support and heat conducting medium attachment for a stocking drier form, a form receiving head, a member fixed to the head, a support revolubly carrying said member, and a second member extending to within said first member, said second member contacting the first member and adapted to be held stationary to permit said first member to revolve thereon, and means carried by the second member to permit an intake and a return flow through the second member and through said head.

5. A stocking drier form comprising a pair of telescoping tubes, a head on one of said tubes adapted to receive the form thereon, the other of said tubes having intake and outlet passages therethrough and having the first tube revolubly fitted therearound, said head having a drain hole therethrough leading from said form to discharge into said outlet passage, and a pipe extending from said intake passage revolubly through the head.

6. A stocking drier form comprising a pair of telescoping tubes, a head on one of said tubes adapted to receive the form thereon, the other of said tubes having intake and outlet passages therethrough and having the first tube revolubly fitted therearound, said head having a drain hole therethrough leading from said form to discharge into said outlet passage, and a pipe extending from said intake passage revolubly through the head, and a chamber in the upper end of said second tube over which the outlet of said hole may travel upon rotation of the head.

7. A stocking drier form comprising a pair of telescoping tubes, a head on one of said tubes adapted to receive the form thereon, the other of said tubes having intake and outlet passages therethrough and having the first tube revolubly fitted therearound, said head having a drain hole therethrough leading from said form to discharge into said outlet passage, and a pipe extending from said intake passage revolubly through the head, and means preventing the axial movement of one tube in relation to the other.

In testimony whereof I affix my signature.

LESLIE W. GALLOWAY.